US008676906B2

(12) United States Patent
Rabii

(10) Patent No.: US 8,676,906 B2
(45) Date of Patent: Mar. 18, 2014

(54) EMAIL ACCESS MANAGER FOR A WIRELESS COMMUNICATION DEVICE

(75) Inventor: Khosro M. Rabii, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 132 days.

(21) Appl. No.: 13/035,610

(22) Filed: Feb. 25, 2011

(65) Prior Publication Data
US 2012/0221651 A1 Aug. 30, 2012

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | |
|---|---|---|---|
| 6,101,531 A * | 8/2000 | Eggleston et al. ............. | 709/206 |
| 6,883,016 B1 * | 4/2005 | Fujii et al. .................... | 709/203 |
| 7,024,491 B1 * | 4/2006 | Hanmann et al. ............. | 709/248 |
| 7,058,829 B2 * | 6/2006 | Hamilton ...................... | 713/320 |
| 7,103,634 B1 * | 9/2006 | Ullmann et al. .............. | 709/206 |
| 7,117,379 B2 * | 10/2006 | Hamilton ..................... | 713/320 |
| 7,290,034 B2 * | 10/2007 | Budd et al. ................... | 709/206 |
| 7,321,930 B2 * | 1/2008 | Ferguson et al. ............. | 709/223 |
| 7,509,575 B2 * | 3/2009 | Makela ......................... | 715/238 |
| 7,536,440 B2 | 5/2009 | Budd et al. | |
| 7,734,936 B2 * | 6/2010 | Hamilton ...................... | 713/300 |
| 7,996,476 B2 * | 8/2011 | Geffner et al. ............... | 709/206 |
| 8,069,215 B2 * | 11/2011 | Jennings ....................... | 709/207 |
| 8,086,677 B2 * | 12/2011 | Murphy ........................ | 709/206 |
| 8,099,468 B2 * | 1/2012 | Iwasawa et al. ............. | 709/206 |
| 8,280,367 B2 * | 10/2012 | Wilson et al. ................ | 455/422.1 |
| 8,301,916 B2 * | 10/2012 | Hamilton ..................... | 713/300 |
| 2003/0220966 A1 * | 11/2003 | Hepper et al. ............... | 709/203 |
| 2005/0038863 A1 * | 2/2005 | Onyon et al. ................ | 709/207 |
| 2005/0048960 A1 * | 3/2005 | Yamauchi et al. ........... | 455/418 |
| 2006/0077949 A1 | 4/2006 | Allen et al. | |
| 2006/0111086 A1 * | 5/2006 | Wilson et al. ................ | 455/413 |
| 2006/0246878 A1 | 11/2006 | Khoury | |

(Continued)

FOREIGN PATENT DOCUMENTS

| | | | | |
|---|---|---|---|---|
| EP | 2076067 A1 | 7/2009 | | |
| JP | 11187038 A * | 7/1999 | ............. | H04L 12/28 |
| WO | WO2004010249 A2 | 1/2004 | | |

OTHER PUBLICATIONS

International Search Report and Written Opinion—PCT/US2012/026649—ISA/EPO—Jul. 16, 2012.

*Primary Examiner* — Alicia Baturay
(74) *Attorney, Agent, or Firm* — John Rickenbrode; Brent Boyd

(57) ABSTRACT

In general, this disclosure relates to techniques for management of email access for a wireless communication device (WCD). The techniques may utilize an email access manager that selects a synchronization mode to synchronize with a remote email server and selects a transfer mode to transfer email messages with the remote email server based on context data regarding the WCD. The context data of the WCD may include one or more of quality of service (QoS) of network connections with the remote email server, battery status of the WCD, and user settings for the WCD. The email access manager monitors the context data from one or more managers, applications, and/or memory within the WCD. The techniques described herein enable an email application on a WCD to dynamically alter synchronization and transfer of email messages with a remote email server as appropriate given the context of the WCD.

49 Claims, 6 Drawing Sheets

(56) References Cited

U.S. PATENT DOCUMENTS

| | | |
|---|---|---|
| 2007/0238440 A1 | 10/2007 | Sengupta et al. |
| 2009/0003252 A1 | 1/2009 | Salomone et al. |
| 2009/0172109 A1* | 7/2009 | Weir et al. .................... 709/206 |
| 2009/0191925 A1* | 7/2009 | Moseler et al. ............... 455/573 |
| 2009/0307322 A1* | 12/2009 | Iwasawa et al. ............. 709/206 |
| 2010/0030860 A1* | 2/2010 | Iwasawa et al. ............. 709/206 |
| 2010/0141400 A1 | 6/2010 | Radulescu et al. |
| 2010/0159948 A1* | 6/2010 | Spivey et al. ............... 455/456.1 |
| 2010/0174790 A1 | 7/2010 | Dubs et al. |
| 2010/0174796 A1 | 7/2010 | Fleck et al. |
| 2010/0235504 A1 | 9/2010 | Sengupta et al. |
| 2011/0191429 A1* | 8/2011 | Tu et al. ....................... 709/206 |

* cited by examiner

EMAIL ACCESS MANAGER FOR A WIRELESS COMMUNICATION DEVICE

TECHNICAL FIELD

The disclosure relates to email applications and, more particularly, management of email access with a wireless communication device.

BACKGROUND

Wireless communication devices (WCDs), such as mobile telephones, portable computers with wireless communication cards, and personal digital assistants (PDAs), portable media players, or other flash memory devices with wireless communication capabilities, are typically powered by limited battery resources. Improved battery life and battery life conservation are, therefore, of paramount concern when designing WCDs. The concern for battery life is offset, however, by demands by users for increased applications with network connectivity on WCDs, such as the so-called "smart" applications that provide email and browser accessibility.

An email application on a WCD ordinarily consumes a large amount of power because it requires both network connectivity and display. The email application requires a network connection to synchronize with a remote email server and, once synchronized, transfer email messages to and from the remote email server. The amount of power consumed may be decreased by reducing the frequency with which the email application synchronizes with the remote email server. The email synchronization frequency may be manually configured based on user and/or manufacturer settings. In some cases, a manufacturer may provide a user with email synchronization frequency options that are relatively long in order to conserve battery life. For example, WCDs with email applications may provide options for a user to select the frequency of email synchronizations to be every 15 minutes, every 30 minutes, every hour, or the like.

SUMMARY

In general, this disclosure relates to techniques for management of email access for a wireless communication device (WCD). The techniques may utilize an email access manager that selects a synchronization mode to synchronize with a remote email server and selects a transfer mode to transfer email messages with the remote email server based on context data regarding the WCD. The context data of the WCD may include one or more of quality of service (QoS) of network connections with the remote email server, battery status of the WCD, and user settings for the WCD. The email access manager monitors the context data from one or more applications and/or memory within the WCD. The techniques described herein may enable an email application on a WCD to dynamically alter synchronization and transfer of email messages with a remote email server as appropriate given the context of the WCD.

In some examples, the email access manager may evaluate context in a hierarchical manner. For example, the email access manager may monitor QoS of network connections and select a network connection with an acceptable QoS over which to synchronize with the remote email server. The email access manager may monitor the battery status of the WCD and determine when to synchronize with the remote email server. Once the WCD is synchronized with the remote email server, the email access manager may evaluate the battery status and the user settings of the WCD to determine what types of email messages and content to transfer with the remote email server. In this way, the techniques may reduce battery consumption of the email application by reducing synchronization and transfer of email messages during periods of low battery reserve, while still providing a high level of email accessibility during periods of normal battery reserve.

In one example, the disclosure is directed toward a method of accessing email with a wireless communication device, the method comprising monitoring, with a processor included in the wireless communication device, context data of the wireless communication device, selecting, with the processor, a synchronization mode to synchronize with a remote email server via a network connection based on one or more of the context data, and selecting, with the processor, a transfer mode to transfer email messages with the remote email server over the network connection based on one or more of the context data, once the wireless communication device is synchronized with the remote email server.

In another example, the disclosure is directed toward a wireless communication device capable of accessing email, the wireless communication device comprising memory that stores at least some context data regarding the wireless communication device. The wireless communication device also includes an email access manager comprising one or more processors that monitors the context data, selects a synchronization mode to synchronize with a remote email server via a wireless network connection based on one or more of the context data, and selects a transfer mode to transfer email messages with the remote email server over the network connection based on one or more of the context data, once the wireless communication device is synchronized with the remote email server.

In a further example, the disclosure is directed toward a wireless communication device capable of accessing email, the wireless communication device comprising means for monitoring context data of the wireless communication device. The wireless communication device also includes means for selecting a synchronization mode to synchronize with a remote email server via a wireless network connection based on one or more of the context data, and means for selecting a transfer mode to transfer email messages with the remote email server over the network connection based on one or more of the context data, once the wireless communication device is synchronized with the remote email server.

In another example, the disclosure is directed toward a computer program product comprising a computer-readable medium having stored thereon instructions that, when executed, cause a processor to monitor context data of the wireless communication device, select a synchronization mode to synchronize with a remote email server via a network connection based on one or more of the context data, and select a transfer mode to transfer email messages with the remote email server over the network connection based on one or more of the context data, once the wireless communication device is synchronized with the remote email server.

The details of one or more examples of the disclosure are set forth in the accompanying drawings and the description below. Other features, objects, and advantages will be apparent from the description and drawings, and from the claims.

DETAILED DESCRIPTION

In general, this disclosure relates to techniques for management of email access for a wireless communication device (WCD). The techniques may utilize an email access manager that selects a synchronization mode to synchronize with a remote email server and selects a transfer mode to transfer email messages with the remote email server based on context data regarding the WCD. The context data of the WCD may include one or more of quality of service (QoS) of network connections with the remote email server, battery status of the WCD, and user settings for the WCD. The email access manager monitors the context data from one or more applications and/or memory within the WCD. The techniques described herein may enable an email application on a WCD to dynamically alter synchronization and transfer of email messages with a remote email server as appropriate given the context of the WCD.

Figure 1:
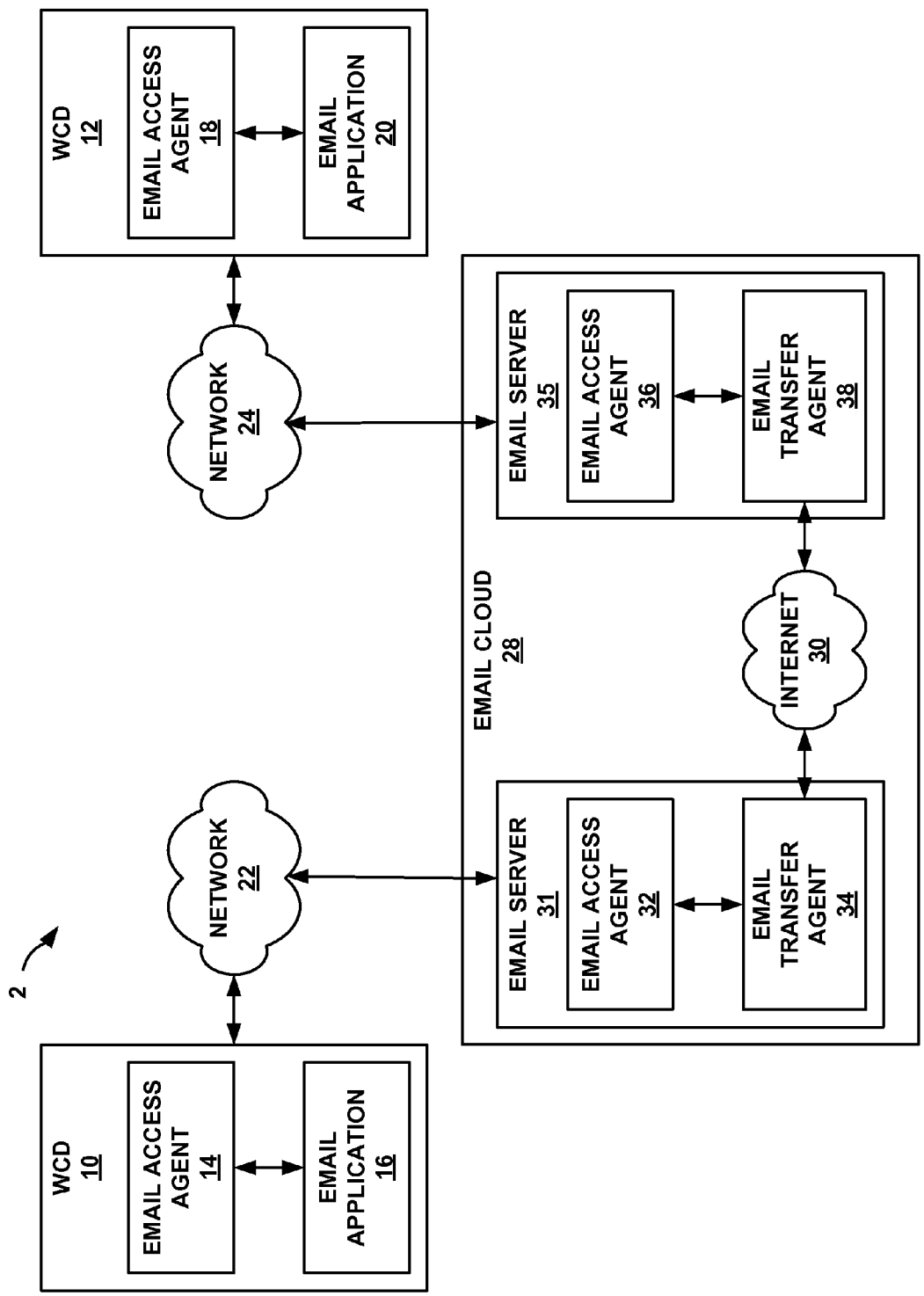
FIG. 1 is a block diagram illustrating a wireless communication system in which wireless communication devices (WCDs) transfer email messages via remote email servers within an email network cloud.

FIG. 1 is a block diagram illustrating a wireless communication system 2 in which a first wireless communication device (WCD) 10 and a second wireless communication device (WCD) 12 may transfer email messages via remote email servers 31 and 35 within an email cloud 28. At least one of WCDs 10 and 12 may include an email access manager associated with its email application. In accordance with various examples of this disclosure, the email access manager may select synchronization and transfer modes to synchronize and transfer email messages with remote email server 31, 35 based on context data regarding WCD 10, 12. In other examples, both WCD 10 and 12 may also transfer email messages with non-mobile devices via remote email servers 31 and 35. For example, WCD 10 or WCD 12 may send and receive email messages with a desktop computer, a laptop computer, or another wired device.

In the illustrated example, system 2 includes first WCD 10 connected to email cloud 28 via a first network 22, which may include a mobile wireless network or a WiFi network. System 2 also includes second WCD 12 connected to email cloud 28 via a second network 24, which may include a mobile wireless network or a WiFi network. Both types of networks may comprise either a local area network (LAN) or a wide area network (WAN). First WCD 10 includes an email access agent 14 and an email application 16. Second WCD 12 includes an email access agent 18 and an email application 20. In other examples, system 2 may include a plurality of WCDs connected to email cloud 28.

WCDs 10 and 12 may take the form of mobile telephones, portable computers with wireless communication cards, personal digital assistants (PDAs), portable media players, other flash memory devices with wireless communication capabilities, or the like. System 2 may also include one or more base stations (not shown) that support a plurality of mobile wireless or WiFi (e.g., IEEE 802.11x) networks, including networks 22 and 24. A communication service provider may centrally operate and administer one or more of these networks using a base station as a network hub.

System 2 may be designed to support one or more wireless communication technologies such as code division multiple access (CDMA), frequency division multiple access (FDMA), time division multiple access (TDMA), or orthogonal frequency divisional multiplexing (OFDM). The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCMA operation using long term evolution (LTE) for OFDM. In addition, high data rate (HDR) technologies such as cdma2000 1x EV-DO may be used.

Email cloud 28 represents a network that provides email accessibility to WCDs 10 and 12 over the Internet 30. In other examples, email cloud 28 may provide email accessibility to other wireless and/or wired devices via either wired or wireless networks. In the example of FIG. 1, email cloud 28 includes first email server 31 connected to second email server 35 via Internet 30, in which first remote email server 31 is connected to WCD 10 via wireless network 22 and second remote email server 35 is connected to WCD 12 via wireless network 24. Moreover, first remote email server 31 includes an email access agent 32 and an email transfer agent 34. Second remote email server 35 includes an email access agent 36 and an email transfer agent 38. In other examples, email cloud 28 may include a plurality of email servers within email cloud 28.

As an example, the operation of the devices illustrated in FIG. 1 will be described in the context of first WCD 10 sending an email message to second WCD 12. In other examples, second WCD 12 may send an email message to first WCD 10, or another wireless and/or wired device may send an email message to first WCD 10 or second WCD 12. First, a user may compose an email message using email application 16 operating on first WCD 10 to be sent to second WCD 12. An email message includes an envelope and content, which includes header content and body content. The envelope includes a set of lines containing information about transportation of the email message. For example, the envelope may include the address of first WCD 10, i.e., the sender, the address of second WCD 12, i.e., the recipient, and timestamps showing when the email message was sent by intermediary servers within network 22 to email access agent 32 within remote email server 31. The envelope begins with a "from" line and is changed each time it passes through an intermediary server within network 22. Envelopes may enable a user to see the exact path take by the email message and how long it took each intermediary server to process the email message.

The header content of the email message generally includes header fields, which are a set of lines describing settings of the email message. For example, the header content at least includes a "From" field with the email address of first WCD 10, i.e., the sender, a "To" field with the email address of second WCD 12, i.e., the recipient, and a "Date" field the data when the email message was sent by first WCD 12. The header content may optionally include a "Received" field with various information about the intermediary servers and the date when the message was processed, a "Reply-To" field with a reply address that may be different than the sender, a "Subject" field with a subject of the email message, and a "Message-ID" field with a unique identification for the email message. Additionally, the body content of the email message includes the composed message, which is separated from the header content by a line break.

Once the user has composed the email message in email application 16, email access agent 14 may then synchronize with first remote email server 31 over network 22 and transmit the email message to first remote email server 31. Email access agent 14 may transmit the email message using the Simple Mail Transfer Protocol (SMTP). In general, email access agents for client-side email applications use SMTP to send email messages to a remote email server, and use Internet Message Access Protocol (IMAP) or Post Office Protocol (POP) to receive email messages from a remote email server.

Email access agent 32 within first remote email server 31 receives the email message from first WCD 10 and verifies the sender and receiver information included in the envelope of the email message. Email access agent 32 then passes the email message to email transfer agent 34. Email transfer agent 34 transfers the email message over the Internet 30 to second remote email server 35, which is connected to second WCD 12, i.e., the recipient. Email access agent 32 may use SMTP to receive the email message and email transfer agent 34 may use SMTP to transfer the email message. In general, email access agents and email transfer agents for server-side email applications use SMTP to send and receive email messages.

Email transfer agent 38 within second remote email server 35 receives the email message from first remote email server 31. Email transfer agent 38 may archive the email message within second remote email server 35 until the next synchronization with second WCD 12. When email access agent 18 synchronizes with second remote email server 35 over network 24, email access agent 36 within second remote email server 35 transmits the email communication to second WCD 12. Email access agent 18 receives the email message from second remote email server 35 and places the email message in an email box, which may be a file, a directory, or a database. The email message is then available for a user of second WCD 12 to view using email application 20.

As described above, second WCD 12 must wait to receive the email message from first WCD 10 until second WCD 12 synchronizes with second remote email server 35. It may be optimal to synchronize with second remote email server 35 as frequently as possible to provide the user of second WCD 12 with nearly constant email accessibility, but the network connectivity required for email application 20 consumes a large amount of power. In order to compromise between network connectivity and battery life conservation, WCDs 12 may include an email access manager associated with email application 20 that selects a synchronization mode to synchronize with second remote email server 35 and selects a transfer mode to transfer email messages with second remote email server 35 based on context data regarding second WCD 12. In other examples, first WCD 10 may also include an email access manager associated with email application 16.

As described in more detail below, the email access manager enables email application 20 on second WCD 12 to dynamically alter synchronization and transfer of email messages with second remote email server 35 as appropriate given the context of second WCD 12. The email access manager monitors the context data from one or more managers, applications, and/or memory within second WCD 12. The context data of second WCD 12 may include one or more of QoS of network connections with second remote email server 35, battery status of second WCD 12, and user settings for second WCD 12.

In some examples, the email access manager associated with second WCD 12 may evaluate context in a hierarchical manner. As an example, the email access manager may monitor QoS of network connections and select a network connection across network 24, with an acceptable QoS over which to synchronize with second remote email server 35. The email access manager may monitor the battery status of second WCD 12 and determine when to synchronize with second remote email server 35. Subsequent to second WCD 12 being synchronized with second remote email server 35, the email access manager may evaluate the battery status and the user settings of second WCD 12 to determine what types of email messages and content to transfer with second remote email server 35. In this way, the email access manager may reduce battery consumption of email application 20 on second WCD 12 by reducing synchronization and transfer of email messages during periods of low battery reserve, while still providing a high level of email accessibility during periods of normal battery reserve.

Figure 2:
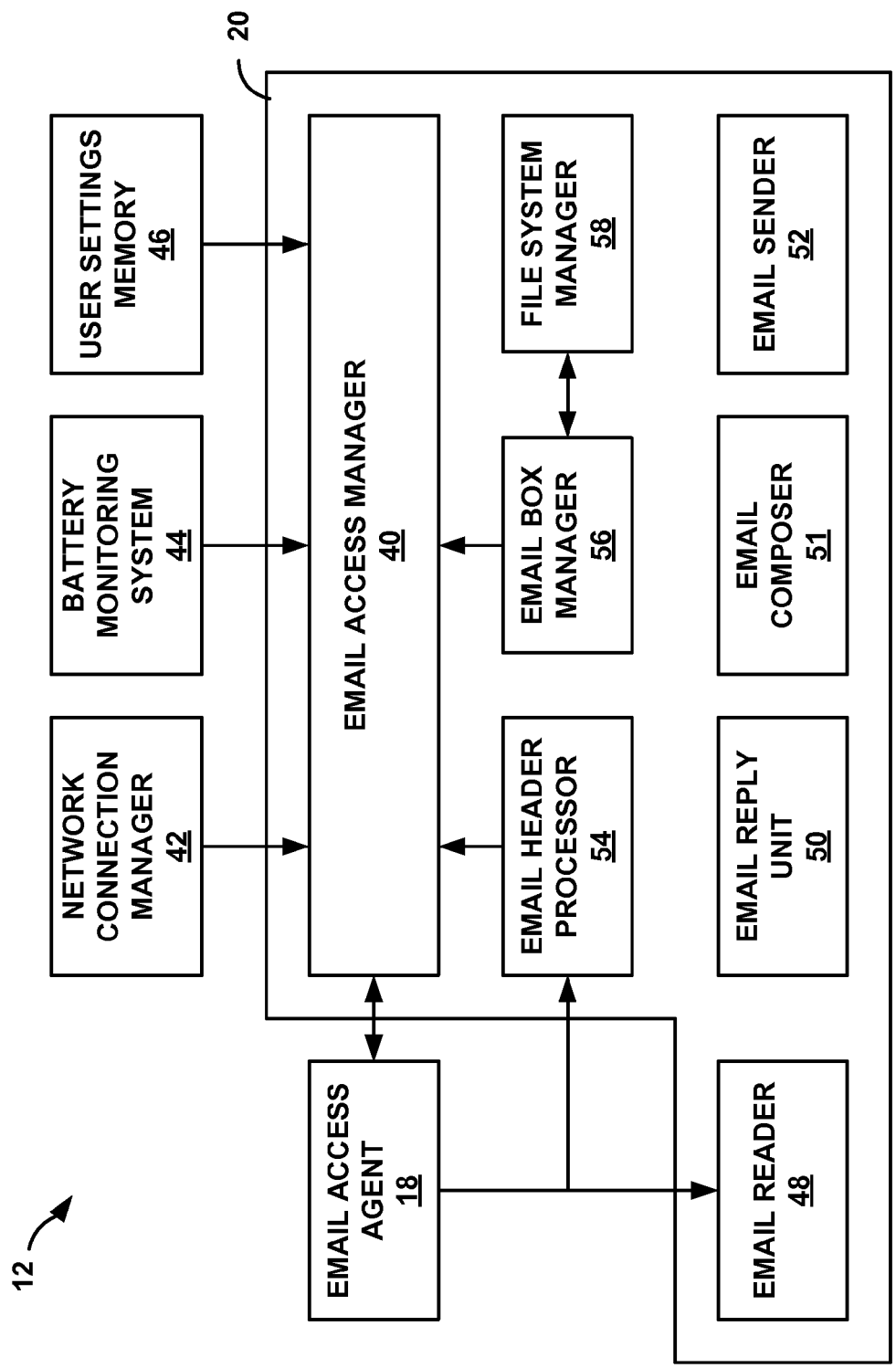
FIG. 2 is a block diagram illustrating a WCD with an email access manager that selects synchronization and transfer modes to synchronize and transfer email messages with a remote email server based on context data regarding the WCD.

FIG. 2 is a block diagram illustrating WCD 12 of FIG. 1 with an email access manager 40 comprising one or more processors that selects synchronization and transfer modes to synchronize and transfer email messages with a remote email server based on context data regarding WCD 12. In other examples, email access manager 40 may be included within WCD 10 of FIG. 1, or another wireless device. In the illustrated example, WCD 12 includes email access agent 18 that synchronizes and transfers email messages with a remote email server, such as remote email server 35 from FIG. 1, according to instructions received from email access manager 40. WCD 12 includes network connection manager 42, battery monitoring system 44, and user settings memory 46. WCD 12 also includes email application 20 that provides a user of WCD 12 with email accessibility. More specifically, email application 20 includes email access manager 40, email reader 48, email reply unit 50, email composer 51, email sender 52, email header processor 54, email box manager 56, and file system manager 58.

In the illustrated example, email access manager 40 is included within email application 20 operating on WCD 12. In other examples, email access manager 40 may be a standalone application operating on WCD 12. In some examples, email access manger 40 may comprise one or more processors within WCD 12, such as one or more digital signal processors (DSPs), general purpose microprocessors, application specific integrated circuits (ASICs), field programmable logic arrays (FPGAs), or other equivalent integrated or discrete logic circuitry. The other modules and/or units within WCD 12 may also comprise one or more processors within WCD 12, such as one or more DSPs, general purpose microprocessors, ASICs, FPGAs, or other equivalent integrated or discrete logic circuitry.

When email access agent 18 receives an email message from remote email server 35, it passes the email message to email reader 48 and email header processor 54. Email reader 48 presents the content of the received email message to the user of WCD 12. Email header processor 54 may evaluate the header content of the received email message and, in some cases, present only the header content to the user of WCD 12. Email access agent 18 may also pass the received email message to email box manager 56 to place the received email messages in an appropriate email box, e.g., an inbox. Email box manager 56 may use the header content of the received email message from email header processor 54 to present the email message to a user in the email box. Email box manager 56 may also use the header content to filter the email message into a specific file or folder of the email box. Email box manager 56 may then pass the email message to file system manager 58 to be stored within a file, a directory, or a database associated with the email box on WCD 12. In some cases, WCD 12 may include a memory providing an email cache, i.e., short-term local storage, (not shown) for rapid access to recently received emails by file system manager 58 and email box manager 56. In this way, older received emails may be stored on a remote server within email cloud 28.

The user may compose a reply message to the received email message using email reply unit 50. Email reply unit 50 may reuse the header content for the received email message, but switch the "To" and "From" fields. The user may also compose a new email message using email composer 51, and populate the header content manually or from a contacts list accessible from email application 20. Email sender 52 may prepare the composed email message for transmission to its recipient. In some cases, email sender 52 may archive the composed email message on WCD 12 until the next synchronization between WCD 12 and remote email server 35. When email access agent 18 is synchronized with remote email server 35, email sender 52 may retrieve the email message from the archive for email access agent 18 to transmit the email message according to the instructions from email access manager 40.

WCD 12 further includes network connection manager 42 that manages the relationship of WCD 12 and remote email server 35 with different network connections across network 22. The network connections may include one or more mobile wireless network connections and/or one or more WiFi network connections. Network connection manager 42 may also store QoS levels for each of the network connections between WCD 12 and remote email server 35. In some cases, the QoS level of a currently selected network connection may be displayed to the user of WCD 12, e.g., using a small network "bars" icon, lights or sounds to indicate different network QoS conditions. Network connection manager 42 may periodically update the QoS levels to reflect a current condition for each of the network connections. The QoS of the network connections may be measured by a symbol-error ratio (SER), packet-error ratio (PER), bit-error ratio (BER), signal-to-noise ratio (SNR), receiver signal strength indication (RSSI), or some other connection quality indication. For example, channel fades, random noise, burst noise, and/or compounded noise on a network connection may adversely affect the PER, and resultant BER, of the network connection.

WCD 12 also may include a battery monitoring system 44 that monitors a battery status of WCD 12. Battery monitoring system 44 may store battery status information that reflects whether WCD 12 is wall plugged or using its battery reserve, and if using the battery reserve, the level of remaining battery power. In some cases, the battery status information may be displayed to the user of WCD 12, e.g., using a small battery icon, lights or sounds to indicate different battery conditions. Battery monitoring system 44 may update the battery status information almost continuously to reflect an accurate battery status to the user of WCD 12.

WCD 12 also may include a user settings memory 46 that stores user settings for WCD 12. For example, the user settings may include synchronization frequency preferences, quiet hours, high-priority contacts, high-priority subjects, email message content transfer preferences, email message chain transfer preferences, a battery reserve threshold level, a network connection QoS threshold level, and a preferred network connection. In some cases, the user settings may include manufacturer settings or default settings that may be altered by the user of WCD 12. As an example, the user may enter or alter the user settings stored in user settings memory 46 via a settings application (not shown) operating on WCD 12.

WCD 12 also includes email access manager 40. In accordance with the techniques described herein, email access manager 40 enables email application 20 to dynamically alter synchronization and transfer of email messages with remote email server 35 as appropriate given the context of WCD 12. Email access manager 40 monitors context data, including QoS of network connections from network connection manager 42, battery status from battery monitoring system 44, and user settings from user settings memory 46. In some cases, email access manager 40 may also monitor an email cache capacity from file system manager 58 via email box manager 56. Email access manager 40 then selects a synchronization mode to synchronize with remote email server 35 and selects a transfer mode to transfer email messages with remote email server 35 based on the context data.

Email access manager 40 may select over which network connection to synchronize with remote email server 35. Email access manager 40 may monitor QoS of network connections between WCD 12 and remote email server 35 from network connection manager 42. Email access manager 40 may also monitor user settings regarding a network connection QoS threshold level and a preferred network connection from user settings memory 46. Email access manger 40 may determine which of the network connections between WCD 12 and remote email server 35 have QoS levels greater or equal to a network connection QoS threshold level. The network connection QoS threshold level may be set by a manufacturer or a user of WCD 12, pre-determined for the type of network connection, or derived heuristically by network connection manager 42. In some cases, separate network connection QoS threshold levels may be specified for each type of network connection, e.g., mobile wireless and WiFi.

Email access manager 40 may select a network connection from those network connections with acceptable QoS levels. For example, email access manager 40 may select the network connection with a symbol-error ratio (SER) that exceeds the network connection QoS threshold level. In some cases, email access manager 40 may select the network connection with the highest QoS level, or select the first network connection with a QoS level above the QoS threshold level. In other cases, email access manager 40 may select the preferred network connection specified in the user settings, if the preferred network connection is among the network connections with acceptable QoS levels. For example, a user may specify that a mobile wireless network connection is preferred over a WiFi network connection. If none of the network connections have an acceptable QoS level, email access manager 40 may select not to synchronize with remote email server 35. In this way, email access manager 40 ensures that a network connection of acceptable QoS is available before attempting to synchronize with remote email server 35.

Second, email access manager 40 may select when to synchronize with remote email server 35 over the selected network connection. Email access manager 40 may monitor battery status of WCD 12 from battery monitoring system 44. Email access manager 40 may also monitor user settings regarding a battery reserve threshold level, quiet hours, synchronization frequency preferences, high-priority contacts, and high-priority subjects. In some examples, email access manager 40 may also monitor an email cache capacity from file system manager 58 via email box manager 56 to determine if it has space to hold newly received email messages. Upon selecting when to synchronize with remote email server 35, email access manager 40 may send instructions to email access agent 18. Email access agent 18 may then synchronize with remote email server 35 over the selected network connection according to the instructions from email access manager 40.

Email access manger 40 may determine whether the battery status of WCD 12 is wall plugged or battery reserve, and whether a level of the battery reserve is greater or equal to a battery reserve threshold level. Email access manager 40 may select to synchronize with remote email server 35 at different times during different power situations. The battery reserve threshold level may be set by a manufacturer or a user of WCD 12. In some examples, the battery reserve threshold level may be a relatively low battery reserve level, e.g., 10% of full battery level, such that it triggers a critical power situation in which only essential email operations are to be performed by WCD 12.

For example, if the battery status of WCD 12 is wall plugged, email access manager 40 may select to periodically synchronize with remote email serve 35 according to a synchronization frequency specified for a full power situation. The synchronization frequency may be set by a manufacturer or a user and stored in user settings memory 46. The synchronization frequency for the full power situation may be relatively high, e.g., more than once per every 15 minutes, because power consumption is not a concern when WCD 12 is wall plugged.

As another example, if the battery status of WCD 12 is battery reserve that is greater or equal to the battery reserve threshold level, email access manager 40 may select to periodically synchronize with remote email server 35 with a frequency relative to the level of battery reserve. For example, email access manager 40 may calculate a synchronization frequency proportional to the level of battery reserve. As further examples, a high battery reserve level, e.g., near 100%, may dictate a synchronization frequency of more than once every 15 minutes, a medium battery reserve level, e.g., near 50%, may dictate a synchronization frequency of around once every 30 minutes, and a low battery reserve level, e.g., just above 10%, may dictate a synchronization frequency of less than once per hour.

In some cases, a user may specify synchronization frequency preferences that include a minimum synchronization frequency when WCD 12 is in a reserve power situation. The minimum synchronization frequency for the reserve power situation may be relatively low, e.g., less than once per hour, because power consumption is a paramount concern as the battery reserve approaches the battery reserve threshold level. In this way, email access manager 40 conserves the battery reserve by reducing a frequency of synchronizations with remote email server 35 in accordance with a reducing level of battery reserve for WCD 12.

As a further example, if the battery status of WCD 12 is battery reserve that is less than the battery reserve threshold level, email access manager 40 may select to only synchronize with remote email server 35 to send high-priority email messages. For example, a user may specify high-priority contacts and high-priority subjects. Email access manger 40 may identify high-priority email messages to transmit to remote email server 35 based on header content from email sender 52 of email messages archive on WCD 12. In this way, email access manager 40 conserves the battery reserve by only attempting to synchronize with remote email server 35 when the user wants to send one or more high-priority email messages. Email access manager 40, therefore, provides email accessibility for the essential email operations, but does not allow any non-essential email operations that will unnecessarily consume the little remaining battery power.

In some examples, during all power situations, email access manager 40 may immediately synchronize with remote email server 35 once a user has composed a high-priority email message in order to immediately transmit the high-priority email message. In other examples, during all power situations, when the email cache capacity of WCD 12 is full, email access manager 40 may select not to synchronize with remote email server 35. In this way, email access manager 40 conserves the battery reserve by not even attempting to synchronize with remote email server 35 when the email cache has no room to store newly received email messages.

In further examples, if it is during quiet hours, email access manager 40 may select not to synchronize with remote email server 35. For example, a user may specify quiet hours as those hours when the user is unavailable or does not wish to receive email messages, such as when the user is sleeping. In other examples, a manufacture may specify quiet hours as "normal" sleeping hours, e.g., between 11 P.M. and 6 A.M. In some cases, email access manager 40 may select not to synchronize during quiet hours only for a battery reserve situation. In other cases, email access manager 40 may select not to synchronize during quiet hours for all power situations. In this way, email access manager 40 conserves the battery reserve by not even attempting to synchronize with remote email server 35 when the user is unavailable or not interested in sending and receiving new email messages.

In another example, if it is during quiet hours, email access manager 40 may select to periodically synchronize with remote email server 35 according to a low frequency. In this case, a user or a manufacturer may specify quiet hours as non-working hours, e.g., between 6 P.M and 7 A.M., when the user may not require a high level of email accessibility. Email access manager 40 may select to synchronize with remote email server 35 less frequently during quiet hours for all power situations or only for a battery reserve situation. In this way, email access manager 40 conserves the battery reserve by reducing a frequency of synchronizations with remote email server 35 when the user is not working.

Third, once WCD 12 is synchronized with remote email server 35, email access manager 40 may select what type of available email messages to transfer with remote email server 35 and what content of the available email messages to transfer with remote email server 35. Available email message may include those email messages archived within remote email server 35 to be sent to WCD 12 during the next synchronization, and those email message archived within WCD 12 to be sent to remote email server 35 during the next synchronization. Upon selecting a transfer mode to transfer email messages with remote email server 35, email access manager 40 may send instructions to email access agent 18. Email access agent 18 may then send and receive email messages with remote email server 35 over the selected network connection during the synchronization period according to the instructions from email access manager 40.

Email access manager 40 may monitor battery status of WCD 12 from battery monitoring system 44. Email access manager 40 may also monitor user settings regarding a battery reserve threshold level, high-priority contacts, high-priority subjects, email message content transfer preferences, and email message chain transfer preferences. Email access manager 40 may also monitor the email cache capacity from file system manager 58 via email box manager 56.

When the email cache capacity of WCD 12 is full, email access manager 40 may select not to receive any new email messages from remote email server 35. In this example, email access manager 40 may still determine to synchronize with remote email server 35 to send email messages, but not to receive any new email messages. In this way, email access manager 40 conserves the battery reserve by not receiving any new email messages from remote email server 35 when the email cache has no room to store newly received email messages.

Email access manger 40 may determine whether the battery status of WCD 12 is wall plugged or battery reserve, and whether a level of the battery reserve is greater or equal to a battery reserve threshold level. Email access manager 40 may select to transfer different types and content of email messages with remote email server 35 during different power situations. For example, if the battery status of WCD 12 is wall plugged, email access manager 40 may select to transfer entire content of all available email messages with remote email server 35. In this case, email access manager may select to send and receive all available email messages with remote email server 35, and select to send and receive the entire content, including header and body content, of all available email messages because power consumption is not a concern when WCD 12 is wall plugged.

As another example, if the battery status of WCD 12 is battery reserve that is greater or equal to the battery reserve threshold level, email access manger 40 may select to transfer only header content of the available email messages or entire content of the available email messages with remote email server 35 based on the user settings. In the case where a user selects to transfer only header content, email access agent 18 may only pass the received email header content to email header processor 54, and not pass any data to email reader 48. The received email header content may also be passed to email box manager 56 and placed in an email box.

For example, a user may specify email message content transfer preferences when WCD 12 is in a reserve power situation. The email message content transfer preferences may indicate whether a user would prefer to transfer only header content or entire content of available email messages. In some cases, a user may specify a battery reserve threshold level at which to switch from transferring entire content to only header content of the available email messages, or may specify to transfer entire content of high-priority email messages and only header content of all other email messages. In the case where a user selects to transfer only header content, the user may subsequently request to transfer the entire content of selected email messages. In this way, email access manager 40 conserves the battery reserve by reducing an amount of data to transfer with remote email server 35.

As a further example, if the battery status of WCD 12 is battery reserve that is greater or equal to the battery reserve threshold level, email access manger 40 may select to transfer only a most recent email message in an email message chain or the entire email message chain based on the user settings. For example, a user may specify email message chain transfer preferences when WCD 12 is in a reserve power situation. In some cases, the most recent email messages in an email message chain will include copies of all the previous email messages in the chain. Transferring each individual email message within the chain, therefore, may be redundant.

The email message chain transfer preferences may indicate whether a user would prefer to transfer only last email messages or entire email message chains. In some cases, a user may specify a battery reserve threshold level at which to switch from transferring entire email message chains to only last email messages, or may specify to transfer entire email message chains of high-priority email messages and only last email messages of all other email messages. In the case where a user selects to transfer only last email messages, the user may subsequently request to transfer the entire email message chains of selected email messages. In this way, email access manager 40 conserves the battery reserve by reducing an amount of data to transfer with remote email server 35.

As another example, if the battery status of WCD 12 is battery reserve that is less than the battery reserve threshold level, email access manager 40 may select to transfer only high-priority email messages with remote email server 35. Email access manger 40 may identify high-priority email messages to transmit to remote email server 35 based on header content from email sender 52 of email messages archive on WCD 12. Email access manager 40 may identify high-priority email messages to receive from remote email server 35 based on header content from email header processor 54 of email messages archived on remote email server 35. In this way, email access manager 40 conserves the battery reserve by only transferring the high-priority email messages with remote email server 35. Email access manager 40, therefore, provides email accessibility for the essential email operations, but does not allow any non-essential email operations that will unnecessarily consume the little remaining battery power.

In some examples, during all power situations, email access manger 40 may select to transfer only header content of the available email messages or entire content of the available email messages with remote email server 35 based on the user settings. In addition, during all power situations, email access manger 40 may select to transfer only a most recent email message in an email message chain or the entire email message chain based on the user settings. In this way, email access manager 40 conserves the battery reserve by reducing an amount of data to transfer with remote email server 35.

The above examples of the operation of email access manager 40 are merely exemplary. In other examples, email access manager 40 or another processor select a synchronization mode to synchronize with a remote email server and select a transfer mode to transfer email messages with a remote email server based on different types of context data and using different logical decisions.

Figure 3:
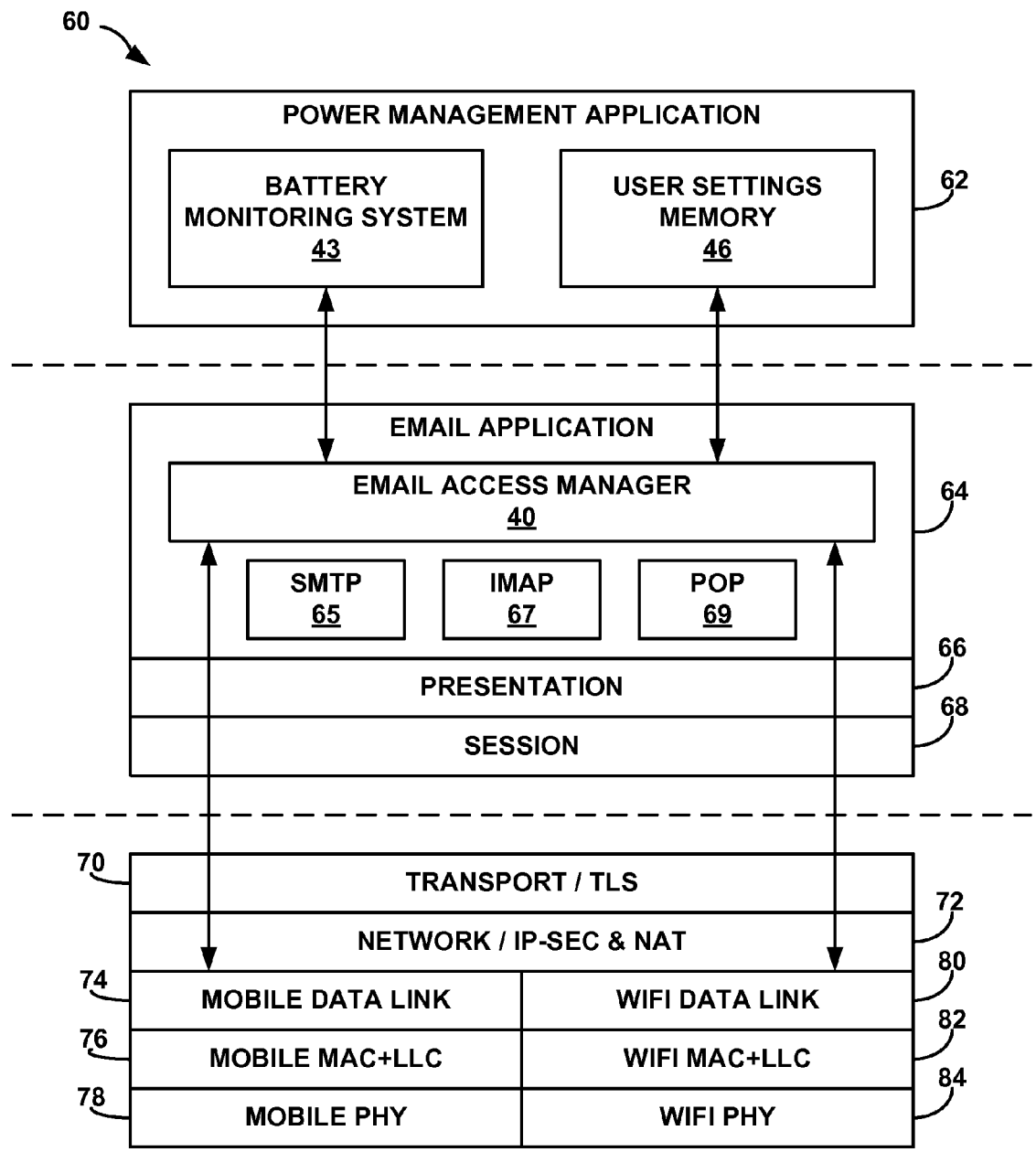
FIG. 3 is a block diagram illustrating an email protocol stack including the email access manager from FIG. 2 within an email application layer.

FIG. 3 is a block diagram illustrating an email protocol stack 60 including email access manager 40 within an email application layer 64. Email protocol stack 60 includes the open systems interconnection (OSI) model layers associated with an email communication system. Email protocol stack 60 will be described herein in relation to an email communication system of WCD 12 of FIG. 2. In other examples, email protocol stack 60 may be associated with an email communication system of another WCD. The functions performed at each layer of email protocol stack 60 may be performed by one or more processors within WCD 12.

Email protocol stack 60 includes an application layer (i.e., Layer 7 of the OSI model) that includes power management application layer 62 and email application layer 64 that interact directly with software applications of one or more processors of WCD 12. Power management application layer 62 interacts with battery monitoring system 43 that provides battery status context data to email access manager 40, and user settings memory 46 that provides user settings context data to email access manager 40. Email application layer 64 interacts with email access manager 40 and several email communication protocols. For example, the email communication protocols used by email application layer 64 may include one or more of the Simple Mail Transfer Protocol (SMTP) 65, Internet Message Access Protocol (IMAP) 67, and Post Office Protocol (POP) 69. As described above, email access agent 18 of WCD 12 may use SMTP 65 to transmit email messages to remote email server 35, and may use IMAP 67 or POP 69 to receive email messages from remote email server 35.

Email protocol stack 60 includes a presentation layer 66 (i.e., Layer 6 of the OSI model) that translates between application and network data formats, and a session layer 68 (i.e., Layer 5 of the OSI model) that manages connections between WCD 12 and remote email server 35. Email protocol stack 60 also includes a transport layer 70 (i.e., Layer 4 of the OSI model) that controls reliability or QoS of data transfer over a network connection between WCD 12 and remote email server 35. In some cases, transport layer 70 may provide secure end-to-end data transfer using an encryption protocol, such as Transport Layer Security (TLS). In addition, email protocol stack 60 includes a network layer 72 (i.e., Layer 3 of the OSI model) that performs network routing to transfer the data over the network connection between WCD 12 and remote email server 35. In some cases, network layer 72 may provide secure end-to-end connectivity using encryption protocols, including Internet Protocol Security (IP-Sec) and Network Address Translation (NAT).

Email protocol stack 60 also includes a data link layer (i.e., Layer 2 of the OSI model) that includes a mobile data link layer 74 and a WiFi data link layer 80. Mobile data link layer 74 manages the relationship of WCD 12 and remote email access server 35 with a mobile wireless network connection, and WiFi data link layer 80 manages the relationship of WCD 12 and remote email access server 35 with a WiFi network connection. The data link layer also has mobile Medium Access Control (MAC) & Logical Link Control (LLC) sub-layers 76 and WiFi MAC and LLC sub-layers 82. The MAC sub-layers manage addressing and channel access, and the LLC sub-layers manage multiplexing and flow control mechanisms for their respective network connections. Mobile data link layer 74 and WiFi data link layer 80 interact with network connection manager 42 of FIG. 2 that provides network connection QoS context data to email access manager 40 regarding the respective network connections.

Finally, email protocol stack 60 includes a physical layer that includes mobile physical layer 78 and WiFi physical layer 84. Mobile physical layer 78 manages the physical relationship between WCD 12 and the mobile wireless network connection. WiFi physical layer 84 that manages the physical relationship between WCD 12 and the WiFi network connection.

Email protocol stack 60 illustrates the interaction between the layers of an email communication system to provide context data to email access manager 40. Specifically, email access manager 40 operating within email application layer 64 monitors context data from battery monitoring system 44 and user settings memory 46 operating within power management application layer 62, and monitors context data from network connection manager 42 operating within mobile data link layer 74 and WiFi data link layer 80. Based on this context data, email access manager 40 selects a synchronization mode to synchronize with remote email server 35 and selects a transfer mode to transfer email messages with remote email server 35.

Figure 4:
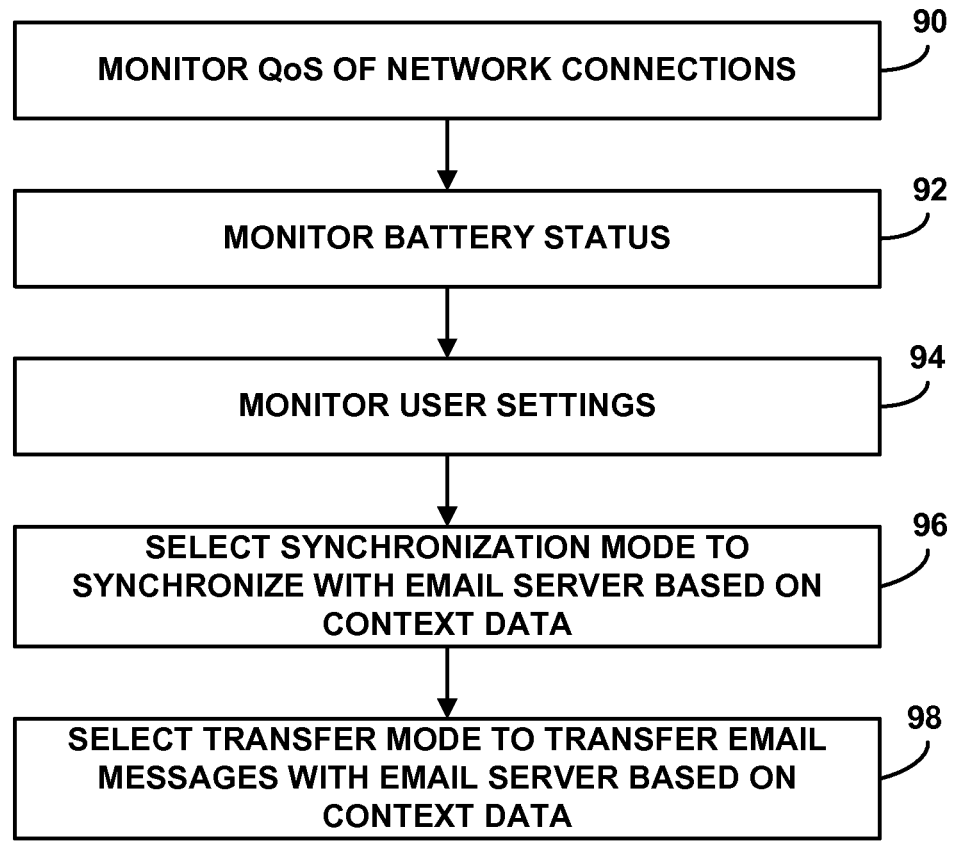
FIG. 4 is a flowchart illustrating an exemplary technique of dynamically altering synchronization and transfer of email messages with a remote email server based on context data regarding a WCD.

FIG. 4 is a flowchart illustrating an exemplary technique of dynamically altering synchronization and transfer of email messages with a remote email server based on context data regarding WCD 12. The technique illustrated in FIG. 4 will be described in relation to email access manager 40 within WCD 12 of FIG. 2. In other examples, the illustrated technique may be performed by an email access manager or other processor within another WCD.

Email access manager 40 monitors QoS of network connections between WCD 12 and remote email server 35 within email cloud 28 of FIG. 1 (90). The network connections may include one or more WiFi network connections and/or one or more mobile wireless network connections. Email access manager 40 may receive the network connection QoS context data from network connection manager 42 operating within WCD 12.

Email access manager 40 also monitors battery status of WCD 12 (92). The battery status of WCD 12 may be wall plugged or battery reserve. In the case where the battery status is battery reserve, email access manager 40 may monitor a level of the battery reserve. Email access manager 40 may receive the battery status context data from battery monitoring system 44 operating within WCD 12.

Email access manager 40 further monitors user settings for WCD 12 (94). The user settings may include synchronization frequency preferences, quiet hours, high-priority contacts, high-priority subjects, email message content transfer preferences, email message chain transfer preferences, a battery reserve threshold level, a network connection QoS threshold level, and a preferred network connection. Email access manager 40 may receive the user settings context data from user settings memory 46 that stores the user settings within WCD 12. In some examples, email access manager 40 may also monitor an email cache capacity to determine if it has space to hold newly received email messages. Email access manager 40 may receive the email cache context data from file system manager 58 via email box manager 56 of email application 20 operating within WCD 12.

After monitoring at least some of the context data, email access manager 40 selects a synchronization mode to synchronize with remote email server 35 based on the monitored context data (96). For example, email access manager 40 may monitor QoS of network connections (90) and select a network connection with an acceptable QoS over which to synchronize with the remote email server. Email access manager 40 may also monitor the battery status of the WCD and select when to synchronize with the remote email server. In some cases, email access manager 40 may select a periodic synchronization frequency or may select specific instances at which to synchronize. Email access manager 40 may then send instructions to email access agent 18 of WCD 12 regarding the selected synchronization mode, and email access agent 18 synchronizes with email access agent 36 within remote email server 35 according to the instructions.

Subsequent to WCD 12 being synchronized with remote email server 25, email access manager 40 selects a transfer mode to transfer email messages with remote email server 35 based on the monitored context data (98). For example, email access manager 40 may monitor the battery status and the user settings of WCD 12 to select what types of email messages and content to transfer with the remote email server. In some cases, email access manager 40 may select to only transfer email messages to and/or from high-priority contacts or with high-priority subjects. In other cases, email access manger 40 may select to transfer only header content of the email messages. Email access manager 40 may then send instructions to email access agent 18 of WCD 12 regarding the selected transfer mode, and email access agent 18 transfers email messages with email access agent 36 within remote email server 35 according to the instructions.

Figure 5:
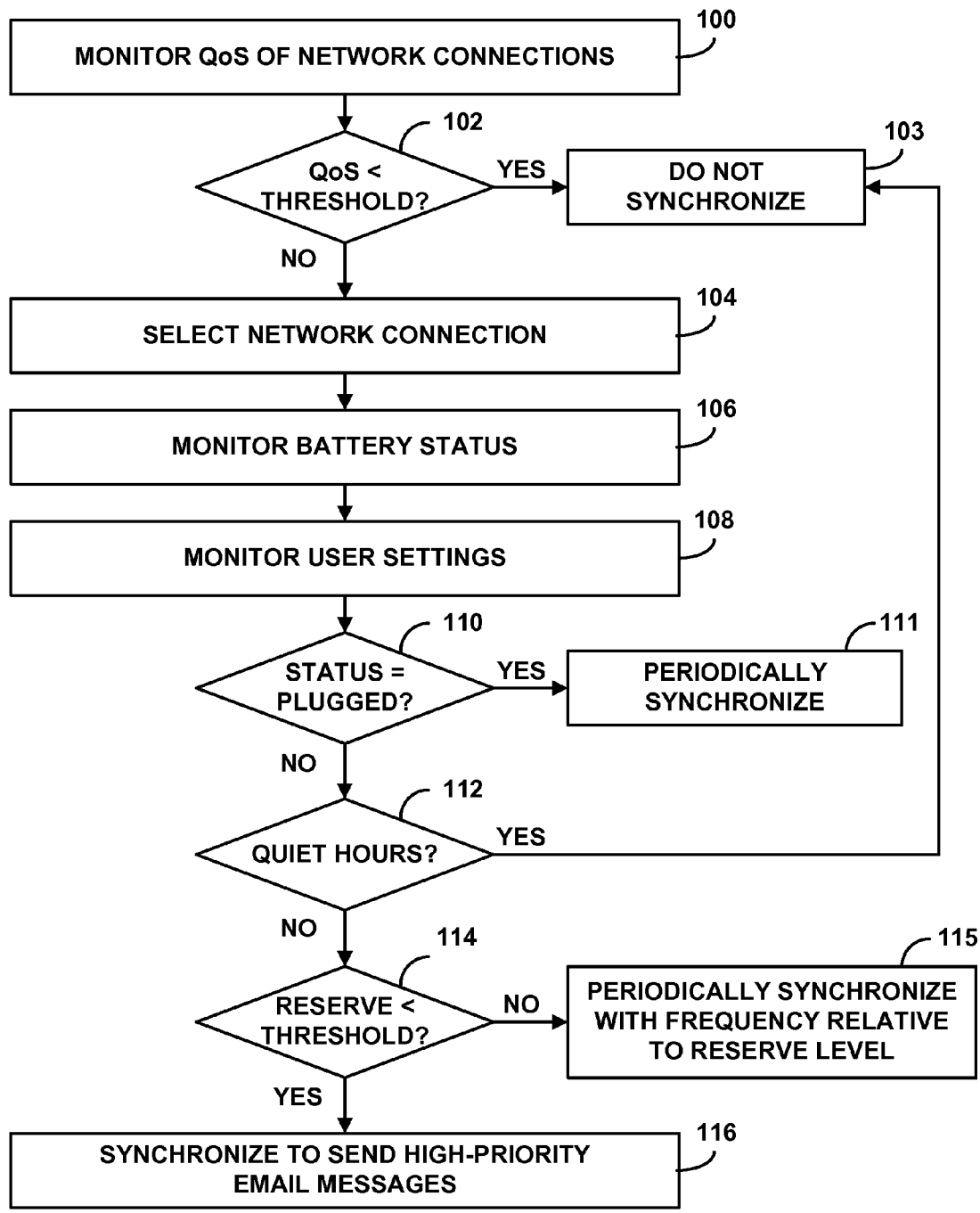
FIG. 5 is a flowchart illustrating an exemplary technique of selecting a synchronization mode to synchronize with a remote email server based on context data regarding a WCD.

FIG. 5 is a flowchart illustrating an exemplary technique of selecting a synchronization mode to synchronize with a remote email server based on context data regarding WCD 12. The technique illustrated in FIG. 5 will be described in relation to email access manager 40 comprising one or more processors within WCD 12 of FIG. 2. In other examples, the illustrated technique may be performed by another processor within another WCD.

Email access manager 40 first monitors QoS of the network connections from network connection manager 42 (100). The network connections may include one or more mobile wireless network connections and/or one or more WiFi network connections between WCD 12 and remote email server 35 (FIG. 1). Email access manager 40 then determines whether any of the network connections has a QoS less than a network connection QoS threshold level (102). In some cases, the network connection QoS threshold level may be specified by a manufacturer or a user and stored in user settings memory 46. In other cases, the network connection QoS threshold level may be pre-determined for the type of network connection or derived heuristically by network connection manager 42. Moreover, separate network connection QoS threshold levels may be specified for each type of network connection, e.g., mobile wireless and WiFi.

If all of the network connections have QoS less than the QoS threshold level (Yes of 102), then email access manager 40 selects not to synchronize with remote email server 35 (103). If, on the other hand, at least one of the network connections have a QoS greater or equal to the QoS threshold (No of 102), then email access manager 40 selects a network connection from the network connections with acceptable QoS levels over which to synchronize with remote email server 35 (104). For example, email access manager 40 may select the network connection with a symbol-error ratio (SER) that exceeds the network connection QoS threshold level. In some cases, email access manager 40 may select the network connection with the highest QoS level, or the first network connection that has QoS greater or equal to the QoS threshold level. In this way, email access manager 40 ensures that a network connection of acceptable QoS is available before attempting to synchronize with remote email server 35.

In some examples, email access manager 40 may monitor the user settings stored in user settings memory 46 to determine a preferred network connection. For example, a user may specify that a mobile wireless network connection is preferred over a WiFi network connection. In that case, email access manager 40 may select the preferred network connection over which to synchronize with remote email server 35, if the preferred network connection is among the network connections with acceptable QoS levels.

Once a network connection over which to synchronize with remote email server 35 has been selected, email access manager 40 monitors battery status from battery monitoring system 44 (106). The battery status of WCD 12 may be wall plugged or battery reserve. In the case where the battery status is battery reserve, email access manager 40 may monitor a level of the battery reserve. Email access manager 40 then monitors user settings from user settings memory 46 (108). The user settings for WCD 12 may include synchronization frequency preferences, quiet hours, high-priority contacts, high-priority subjects, email message content transfer preferences, email message chain transfer preferences, a battery reserve threshold level, a network connection QoS threshold level, and a preferred network connection.

If the battery status of WCD 12 is wall plugged (Yes of 112), then email access manager 40 selects to periodically synchronize according to the user settings (111). For example, a user may specify synchronization frequency preferences when WCD 12 is in a full power situation. The synchronization frequency for the full power situation may be relatively high because power consumption is not a concern when WCD 12 is wall plugged.

If the battery status of WCD 12 is not wall plugged (No of 112), then email access manger 40 may alter when WCD 12 synchronizes with remote email server 35 to conserve the battery reserve. First, if it is during quiet hours (Yes of 112), then email access manager 40 selects not to synchronize with remote email server 35 (103). For example, a user may specify quiet hours as those hours when the user is unavailable or does not wish to receive email messages, such as when the user is sleeping, or does not need a high level of email accessibility, such as when a user is not working. In this way, email access manager 40 conserves the battery reserve by not even attempting to synchronize with remote email server 35 when the user is unavailable or not interested in sending and receiving new email messages.

If it is not during quiet hours (No of 112), email access manager 40 determines whether a level of the battery reserve is less than a battery reserve threshold level (114). In some cases, the battery reserve threshold level may be specified by a user and stored in user settings memory 46. If the battery reserve is less than the battery reserve threshold level (Yes of 114), then email access manager 40 selects to only synchronize with remote email server 35 to send high-priority email messages (116). For example, a user may specify high-priority contacts and high-priority subjects. In this way, email access manager 40 conserves the battery reserve by only attempting to synchronize with remote email server 35 when the user wants to send one or more high-priority email messages. Email access manager 40, therefore, provides email accessibility for the essential email operations, but does not allow any non-essential email operations that will unnecessarily consume the little remaining battery power.

If the battery reserve is greater or equal to the battery reserve threshold level (No of 114), then email access manager 40 selects to periodically synchronize with remote email server 35 with a frequency relative to the battery reserve level (115). Email access manager 40 may calculate a synchronization frequency proportional to the level of battery reserve. In some cases, a user may specify synchronization frequency preferences that include a minimum synchronization frequency when WCD 12 is in a reserve power situation. In this way, email access manager 40 conserves the battery reserve by reducing a frequency of synchronizations with remote email server 35 in accordance with a reducing level of battery reserve for WCD 12.

Upon determining how to synchronize with remote email server 35, email access manager 40 may send instructions to email access agent 18 of WCD 12, and email access agent 18 synchronizes with email access agent 36 within remote email server 35 according to the instructions. The above described technique is merely exemplary, and in other examples, email access manager 40 or another processor may determine how to synchronize with a remote email server based on different types of context data and using different logical decisions.

Figure 6:
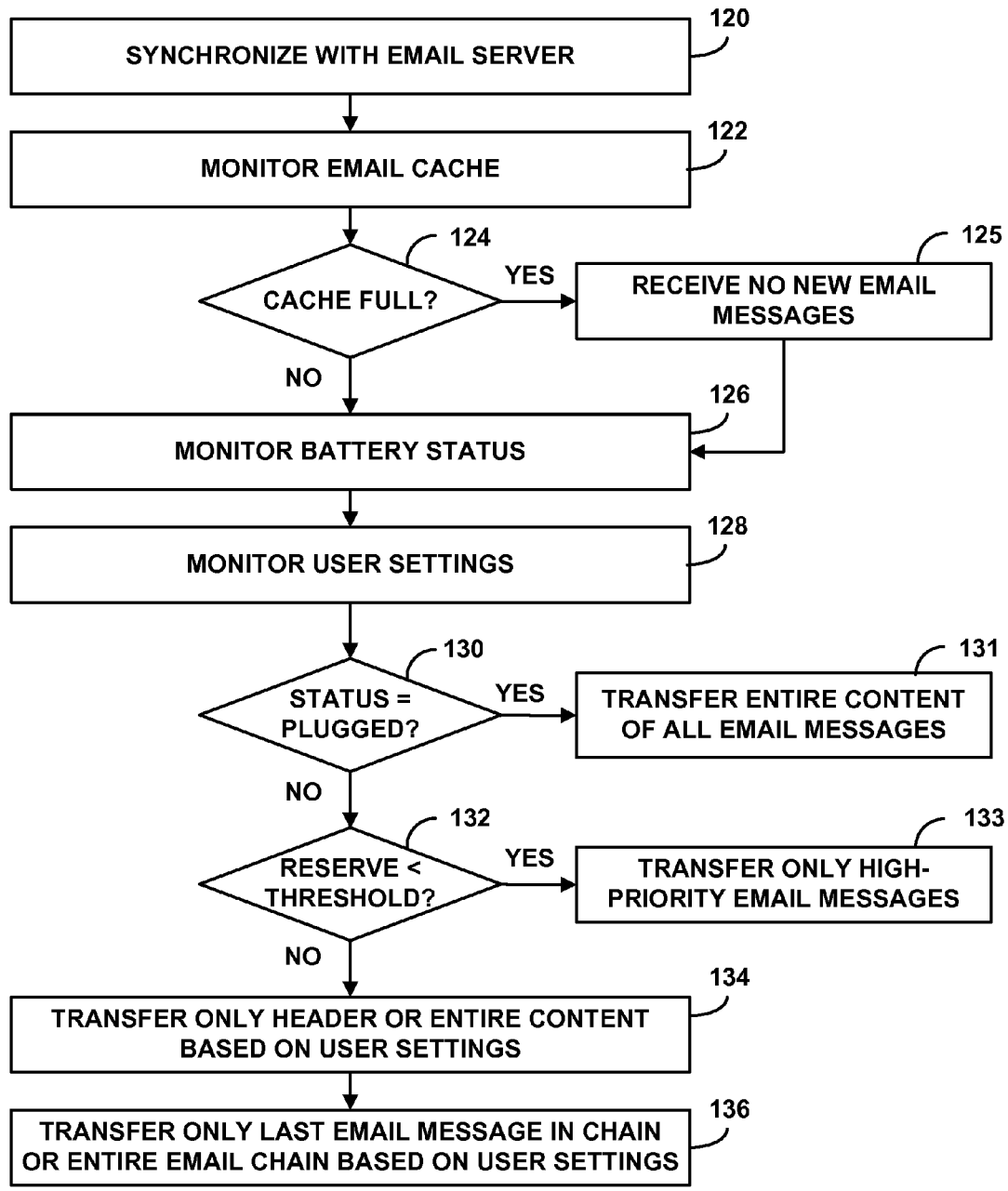
FIG. 6 is a flowchart illustrating an exemplary technique of selecting a transfer mode to transfer email messages with a remote email server based on context data regarding a WCD.

FIG. 6 is a flowchart illustrating an exemplary technique of selecting a transfer mode to transfer email messages with a remote email server based on context data regarding WCD 12. The technique illustrated in FIG. 6 will be described in relation to email access manager 40 comprising one or more processors within WCD 12 of FIG. 2. In other examples, the illustrated technique may be performed by an email access manager or other processor within another WCD.

As described above in relation to FIG. 5, email access manager 40 selects a synchronization mode to synchronize with remote email server 35, and email access agent 18 synchronizes with email access agent 36 within remote email server 35 according to instructions from email access manager 40 (120). Email access manager 40 monitors email cache capacity from file system manager 58 via email box manager 56 of email application 20 operating within WCD 12 (122). If the email cache capacity is full (Yes of 124) such that the email cache does not have space to hold newly received email messages, email access manager 40 selects to not receive any new email messages (125). In this example, email access manager 40 may still select to synchronize with remote email server 35 to send email messages, but not to receive any new email messages. In other examples, email access manager 40 may monitor the email cache capacity when selecting a synchronization mode and select to not even attempt to synchronize when the email cache capacity is full.

In either case, if the email cache capacity is full (Yes of 124, 125) or not full (No of 124), then email access manager 40 monitors battery status from battery monitoring system 44 (126). The battery status of WCD 12 may be wall plugged or battery reserve. In the case where the battery status is battery reserve, email access manager 40 may monitor a level of the battery reserve. Email access manager 40 then monitors user settings from user settings memory 46 (128). The user settings for WCD 12 may include synchronization frequency preferences, quiet hours, high-priority contacts, high-priority subjects, email message content transfer preferences, email message chain transfer preferences, a battery reserve threshold level, a network connection QoS threshold level, and a preferred network connection.

If the battery status of WCD 12 is wall plugged (Yes of 130), then email access manager 40 selects to transfer entire content of all available email messages with remote email server 35 (131). For example, email access manager may select to send and receive all pending email messages with remote email server 35, and select to send and receive the entire content, including header and body content, of all the email messages because power consumption is not a concern when WCD 12 is wall plugged.

If the battery status of WCD 12 is not wall plugged (No of 130), then email access manger 40 may alter the types of email messages and content that WCD 12 transfers with remote email server 35 to conserve the battery reserve. First, email access manager 40 determines whether a level of the battery reserve is less than a battery reserve threshold level (132). In some cases, the battery reserve threshold level may be specified by a user and stored in user settings memory 46.

If the battery reserve is less than the battery reserve threshold level (Yes of 132), then email access manager 40 selects to transfer only high-priority email messages with remote email server 35 (133). For example, a user may specify high-priority contacts and high-priority subjects. In this way, email access manager 40 conserves the battery reserve by only transferring the high-priority email messages with remote email server 35. Email access manager 40, therefore, provides email accessibility for the essential email operations, but does not allow any non-essential email operations that will unnecessarily consume the little remaining battery power.

If the battery reserve is greater or equal to the battery reserve threshold level (No of 132), then email access manager 40 selects to transfer only header content of the available email messages or entire content of the available email messages with remote email server 35 based on the user settings (134). For example, a user may specify email message content transfer preferences when WCD 12 is in a reserve power situation. In this way, email access manager 40 conserves the battery reserve by reducing an amount of data to transfer with remote email server 35.

In addition, email access manager 40 selects to transfer only a most recent email message in an email message chain or the entire email message chain based on the user settings (136). For example, a user may specify email message chain transfer preferences when WCD 12 is in a reserve power situation. In this way, email access manager 40 conserves the battery reserve by reducing an amount of data to transfer with remote email server 35.

Upon selecting a transfer mode to transfer email messages with remote email server 35, email access manager 40 may send instructions to email access agent 18 of WCD 12, and email access agent 18 transfers email messages with email access agent 36 within remote email server 35 according to the instructions. The above described technique is merely exemplary, and in other examples, email access manager 40 or another processor may select a transfer mode to transfer email messages with a remote email server based on different types of context data and using different logical decisions.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

The invention claimed is:

1. A method of accessing email with a wireless communication device, the method comprising:
   monitoring, by a processor of the wireless communication device, context data regarding the wireless communication device, wherein the context data at least includes a battery status of the wireless communication device;
   selecting, by the processor of the wireless communication device, a synchronization mode to synchronize with a remote email server via a network connection based on one or more of the context data, wherein selecting the synchronization mode comprises determining when to synchronize with the remote email server based on the battery status of the wireless communication device; and
   once the wireless communication device is synchronized with the remote email server, selecting, by the processor of the wireless communication device, a transfer mode to transfer email messages with the remote email server over the network connection based on one or more of the context data, wherein selecting the transfer mode comprises determining what types of email messages and content of the email messages to transfer based on the battery status of the wireless communication device.

2. The method of claim 1, further comprising:
   synchronizing with the remote email server based on instructions regarding the selected synchronization mode; and
   transferring email messages with the remote email server based on instructions regarding the selected transfer mode.

3. The method of claim 1, further comprising selecting the network connection over which to synchronize with the remote email server from one or more network connections that have a quality of service (QoS) greater or equal to a QoS threshold.

4. The method of claim 3, wherein selecting the network connection from the network connections with QoS greater or equal to the QoS threshold further comprises selecting a preferred one of the network connections based on user settings.

5. The method of claim 1, wherein selecting a synchronization mode further comprises selecting not to synchronize with the remote email server when all network connections have a quality of service (QoS) less than a QoS threshold.

6. The method of claim 1, wherein selecting a synchronization mode further comprises selecting not to synchronize with the remote email server during quiet hours based on user settings.

7. The method of claim 1, wherein selecting a synchronization mode further comprises selecting to periodically synchronize with the remote email server with a frequency based on user settings when the battery status of the wireless communication device is wall plugged.

8. The method of claim 1, wherein selecting a synchronization mode further comprises selecting to only synchronize with the remote email server to transfer high-priority email messages based on user settings when the battery status of the wireless communication device is battery reserve that is less than a reserve threshold.

9. The method of claim 1, wherein selecting a synchronization mode further comprises selecting to periodically synchronize with the remote email server with a frequency relative to the battery reserve based on user settings when the battery status of the wireless communication device is battery reserve that is greater or equal to a reserve threshold.

10. The method of claim 1, wherein selecting a transfer mode further comprises selecting not to receive new email messages from the remote email server when an email cache within the wireless communication device is full.

11. The method of claim 1, wherein selecting a transfer mode further comprises selecting to transfer entire content of all email messages with the remote email server when the battery status of the wireless communication device is wall plugged.

12. The method of claim 1, wherein selecting a transfer mode further comprises selecting to transfer only high-priority email messages with the remote email server based on user settings when the battery status of the wireless communication device is battery reserve that is less than a reserve threshold.

13. The method of claim 1, wherein selecting a transfer mode further comprises selecting to transfer only header content of email messages with the remote email server based on user settings when the battery status of the wireless communication device is battery reserve that is greater or equal to a reserve threshold.

14. The method of claim 1, wherein selecting a transfer mode further comprises selecting to transfer only a most recent email message in a chain of email messages with the remote email server based on user settings when the battery status of the wireless communication device is battery reserve that is greater or equal to a reserve threshold.

15. The method of claim 1, wherein the context data further comprises quality of service (QoS) of network connections between the wireless communication device and the remote email server.

16. The method of claim 1, wherein the context data further comprises user settings including one or more of synchronization frequency preferences, quiet hours, high-priority contacts, high-priority subjects, email message content transfer preferences, email message chain transfer preferences, a battery reserve threshold level, a network connection quality of service (QoS) threshold level, and a preferred network connection.

17. The method of claim 1, wherein the context data further comprises email cache capacity.

18. A wireless communication device capable of accessing email, the wireless communication device comprising:
   memory that stores at least some context data regarding the wireless communication device; and
   an email access manager comprising one or more processors that monitors the context data, wherein the context data at least includes a battery status of the wireless communication device, selects a synchronization mode to synchronize with a remote email server via a wireless network connection based on one or more of the context data, wherein the selected synchronization mode determines when to synchronize with the remote email server based on the battery status of the wireless communication device, and once the wireless communication device is synchronized with the remote email server, selects a transfer mode to transfer email messages with the remote email server over the network connection based on one or more of the context data, wherein the selected transfer mode determines what types of email messages and content of the email messages to transfer based on the battery status of the wireless communication device.

19. The wireless communication device of claim 18, further comprising an email access agent comprising one or more processors that:
   synchronizes with the remote email server based on instructions received from the processor regarding the selected synchronization mode; and
   transfers email messages with the remote email server based on instructions received from the processor regarding the selected transfer mode.

20. The wireless communication device of claim 18, wherein the email access manager selects the network connection over which to synchronize with the remote email server from one or more network connections that have a quality of service (QoS) greater or equal to a QoS threshold.

21. The wireless communication device of claim 20, wherein the email access manager selects a preferred one of the network connections with QoS greater or equal to the QoS threshold based on user settings.

22. The wireless communication device of claim 18, wherein the email access manager selects not to synchronize with the remote email server when all of the network connections have a quality of service (QoS) less than a QoS threshold.

23. The wireless communication device of claim 18, wherein the email access manager selects not to synchronize with the remote email server during quiet hours based on user settings.

24. The wireless communication device of claim 18, wherein the email access manager selects to periodically synchronize with the remote email server with a frequency based on user settings when the battery status of the wireless communication is wall plugged.

25. The wireless communication device of claim 18, wherein the email access manager selects to only synchronize with the remote email server to send high-priority email messages based on user settings when the battery status of the wireless communication device is battery reserve that is less than a reserve threshold.

26. The wireless communication device of claim 18, wherein the email access manager selects to periodically synchronize with the remote email server with a frequency relative to a level of battery reserve based on user settings when the battery status of the wireless communication device is battery reserve that is greater or equal to a reserve threshold.

27. The wireless communication device of claim 18, wherein the email access manager selects not to receive new email messages from the remote email server when an email cache within the wireless communication device is full.

28. The wireless communication device of claim 18, wherein the email access manager selects to transfer entire content of all email messages with the remote email server when the battery status of the wireless communication device is wall plugged.

29. The wireless communication device of claim 18, wherein the email access manager selects to transfer only high-priority email messages with the remote email server based on user settings when the battery status of the wireless communication device is battery reserve that is less than a reserve threshold.

30. The wireless communication device of claim 18, wherein the email access manager selects to transfer only header content of email messages with the remote email server based on user settings when the battery status of the wireless communication device is battery reserve that is greater or equal to a reserve threshold.

31. The wireless communication device of claim 18, wherein the email access manager selects to transfer only a most recent email message in a chain of email messages with the remote email server based on user settings when the battery status of the wireless communication device is battery reserve that is greater or equal to a reserve threshold.

32. The wireless communication device of claim 18, wherein the context data further comprises quality of service (QoS) of network connections between the wireless communication device and the remote email server.

33. The wireless communication device of claim 18, wherein the context data further comprises user settings including one or more of synchronization frequency preferences, quiet hours, high-priority contacts, high-priority subjects, email message content transfer preferences, email message chain transfer preferences, a battery reserve threshold level, a network connection quality of service (QoS) threshold level, and a preferred network connection.

34. The wireless communication device of claim 18, wherein the context data further comprises email cache capacity.

35. A wireless communication device capable of accessing email, the wireless communication device comprising:
   means for monitoring, by a processor of the wireless communication device, context data of the wireless communication device, wherein the context data at least includes a battery status of the wireless communication device;
   means for selecting, by the processor of the wireless communication device, a synchronization mode to synchronize with a remote email server via a wireless network connection based on one or more of the context data, wherein the selected synchronization mode determines when to synchronize with the remote email server based on the battery status of the wireless communication device; and
   once the wireless communication device is synchronized with the remote email server, means for selecting, by the processor of the wireless communication device, a transfer mode to transfer email messages with the remote email server over the network connection based on one or more of the context data, wherein the selected transfer mode determines what types of email messages and content of the email messages to transfer based on the battery status of the wireless communication device.

36. The wireless communication device of claim 35, further comprising:
   means for synchronizing with the remote email server based on instructions regarding the selected synchronization mode; and
   means for transferring email messages with the remote email server based on instructions regarding the selected transfer mode.

37. The wireless communication device of claim 35, further comprising means for selecting the network connection over which to synchronize with the remote email server from one or more network connections have a quality of service (QoS) greater or equal to a QoS threshold.

38. The wireless communication device of claim 37, further comprising means for selecting a preferred one of the network connections based on user settings.

39. The wireless communication device of claim 35, further comprising means for selecting not to synchronize with the remote email server when all network connections have a quality of service (QoS) less than a QoS threshold.

40. The wireless communication device of claim 35, further comprising means for selecting not to synchronize with the remote email server during quiet hours based on user settings.

41. The wireless communication device of claim 35, further comprising means for selecting to periodically synchronize with the remote email server with a frequency based on user settings when the battery status of the wireless communication device is wall plugged.

42. The wireless communication device of claim 35, further comprising means for selecting to only synchronize with the remote email server to send high-priority email messages based on user settings when the battery status of the wireless communication device is battery reserve that is less than a reserve threshold.

43. The wireless communication device of claim 35, further comprising means for selecting to periodically synchronize with the remote email server with a frequency relative to the battery reserve based on user settings when the battery status of the wireless communication device is battery reserve that is greater or equal to a reserve threshold.

44. The wireless communication device of claim 35, further comprising means for selecting not to receive new email messages from the remote email server when an email cache within the wireless communication device is full.

45. The wireless communication device of claim 35, further comprising means for selecting to transfer entire content of all email messages with the remote email server when the battery status of the wireless communication device is wall plugged.

46. The wireless communication device of claim 35, further comprising means for selecting to transfer only high-priority email messages with from the remote email server based on user settings when the battery status of the wireless communication device is battery reserve that is less than a reserve threshold.

47. The wireless communication device of claim 35, further comprising means for selecting to transfer only header content of email messages with the remote email server based on user settings when the battery status of the wireless communication device is battery reserve that is greater or equal to a reserve threshold.

48. The wireless communication device of claim 35, further comprising means for selecting to transfer only a most recent email message in a chain of email messages with the remote email server based on user settings when the battery status of the wireless communication device is battery reserve that is greater or equal to a reserve threshold.

49. A computer program product comprising a non-transitory computer-readable medium having stored thereon instructions that, when executed, cause a processor of a wireless communication device to:

monitor context data of the wireless communication device, wherein the context data at least includes a battery status of the wireless communication device;

select a synchronization mode to synchronize with a remote email server via a network connection based on one or more of the context data, wherein the selected synchronization mode determines when to synchronize with the remote email server based on the battery status of the wireless communication device; and once the wireless communication device is synchronized with the remote email server, select a transfer mode to transfer email messages with the remote email server over the network connection based on one or more of the context data, wherein the selected transfer mode determines what types of email messages and content of the email messages to transfer based on the battery status of the wireless communication device.

* * * * *